(12) United States Patent
Suzuki et al.

(10) Patent No.: US 7,833,614 B2
(45) Date of Patent: Nov. 16, 2010

(54) BIAXIALLY STRETCHED POLYESTER FILM

(75) Inventors: Takashi Suzuki, Maibara (JP); Akira Sato, Maibara (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 1219 days.

(21) Appl. No.: 11/436,146

(22) Filed: May 16, 2006

(65) Prior Publication Data

US 2006/0275601 A1    Dec. 7, 2006

Related U.S. Application Data

(63) Continuation-in-part of application No. PCT/JP2004/017087, filed on Nov. 17, 2004.

(30) Foreign Application Priority Data

Nov. 18, 2003 (JP) ............................. 2003-387402
Feb. 12, 2004 (JP) ............................. 2004-034489

(51) Int. Cl.
*B32B 7/02* (2006.01)
*B32B 27/08* (2006.01)
*B32B 27/18* (2006.01)
*B32B 27/36* (2006.01)

(52) U.S. Cl. ................ 428/212; 428/323; 428/327; 428/334; 428/336; 428/339; 428/480; 428/910; 525/437

(58) Field of Classification Search ............... None
See application file for complete search history.

(56) References Cited

U.S. PATENT DOCUMENTS

| | | | | |
|---|---|---|---|---|
| 5,308,668 | A * | 5/1994 | Tsuji ........................ 428/43 |
| 6,045,902 | A * | 4/2000 | Imanishi et al. ........... 428/327 |
| 6,054,209 | A * | 4/2000 | Imanishi et al. ........... 428/327 |
| 6,156,441 | A * | 12/2000 | Hamada et al. ........... 428/480 |
| 6,432,527 | B1 * | 8/2002 | Perez et al. .............. 428/343 |
| 6,582,813 | B2 * | 6/2003 | Okumura et al. .......... 428/327 |
| 2006/0073317 | A1 * | 4/2006 | Sato et al. ............... 428/212 |
| 2007/0148423 | A1 * | 6/2007 | Sato et al. ............... 428/212 |
| 2007/0160818 | A1 * | 7/2007 | Suzuki ................... 428/212 |

FOREIGN PATENT DOCUMENTS

| | | | |
|---|---|---|---|
| EP | 127981 | A2 | 12/1984 |
| EP | 0644226 | A1 | 3/1995 |
| EP | 1176162 | A2 | 1/2002 |
| JP | 07-299856 | A | 11/1995 |
| JP | 07-299857 | A | 11/1995 |
| JP | 09-324057 | | 12/1997 |
| JP | 11-005283 | * | 1/1999 |
| JP | 11-227135 | * | 8/1999 |
| JP | 11-302405 | * | 11/1999 |
| JP | 2001-246714 | * | 9/2001 |
| JP | 2002-254508 | * | 9/2002 |
| JP | 2002-254508 | A | 9/2002 |
| JP | 2003-300272 | * | 10/2003 |
| JP | 2004-202702 | * | 7/2004 |

OTHER PUBLICATIONS

International Search Report Re: PCT/JP2004/017087, Feb. 1, 2005.
International Preliminary Report on Patentability Re: PCT/JP2004/017087, Jul. 24, 2006.
European Search Report, Re: EP 04 81 8928 dated Feb. 20, 2007.

* cited by examiner

*Primary Examiner*—Vivian Chen
(74) *Attorney, Agent, or Firm*—George W. Neuner; David G. Conlin; Edwards Angell Palmer & Dodge LLP

(57) ABSTRACT

The present invention relates to a biaxially stretched polyester film comprising a polyester layer A which comprises polybutylene terephthalate and at least one of a copolyester and an amorphous polyester, said biaxially stretched polyester film satisfying any one of the following requirements: (1) the polyester layer A exhibiting one melting point as measured by temperature-rise DSC method, and the polyester film having an edge tear resistance of not more than 100 N in each of longitudinal and width directions thereof; and (2) an average number of uncompatilized polybutylene terephthalate masses having a maximum length of not less than 1 μm which are present in a section of the layer A is not more than 1.0 per 100 μm² of the section of the layer A, and the polyester film having an edge tear resistance of not more than 100 N in each of longitudinal and width directions thereof.

5 Claims, No Drawings

BIAXIALLY STRETCHED POLYESTER FILM

CROSS REFERENCES TO RELATED APPLICATION

This is a continuation-in-part of application of international application PCT/JP2004/017087, filed Nov. 17, 2004 which designated the US. PCT/JP2004/017087 claims priorities to JP Application No. 2003-387402, filed Nov. 18, 2003 and JP Application No. 2004-034489, filed Feb. 12, 2004 September 2001. The entire contents of these applications are incorporated herein by reference.

BACKGROUND OF THE INVENTION

The present invention relates to a biaxially stretched polyester film, and more particularly, to a biaxially stretched polyester film which can be suitably used as a packaging material for industrial materials, drugs, sanitary materials, foods, etc., and can exhibit not only a less deviation in thickness but also a good hand cut-off property.

Conventional packaging materials for industrial materials, drugs, sanitary materials, foods, etc., have been frequently required to have a good hand cut-off property. For example, bag-shaped packaging materials for confectioneries, powdery drugs, etc., having a good hand cut-off property are largely advantageous because of facilitated removal of contents therefrom.

As the material having such a good hand cut-off property, there are known cellophane, a so-called moisture-proof cellophane obtained by coating cellophane with a vinyl chloride-vinyl acetate copolymer, a film obtained by coating cellophane with vinylidene chloride (K-coat cellophane), etc.

The cellophane, moisture-proof cellophane, K-coat cellophane, etc., are excellent in hand cut-off property, but tend to suffer from change in their properties as well as deteriorated printability depending upon ambient humidity. In addition, the cellophane as a base material is expensive, and it is doubtful whether or not stable supply of the cellophane can be ensured in future. Further, the K-coat cellophane has a possibility of generating dioxins upon burning and, therefore, tends to be difficult to use from the viewpoint of avoiding environmental pollution. On the other hand, the use of aluminum foils also tends to be restrained from the viewpoint of avoiding environmental pollution.

With such a recent tendency, there has been proposed the packaging material having a good hand cut-off property which is made of a polyester film in place of cellophane (refer to Japanese Patent Application Laid-open (KOKAI) No. 5-104618). The polyester film has been frequently used as a packaging material because of excellent properties thereof such as mechanical properties, dimensional stability, heat resistance, water resistance, transparency, etc., but has a poor hand cut-off property owing to the excellent mechanical properties.

To solve problems due to the poor hand cut-off property of the polyester film, there have been proposed, for example, the monoaxially oriented polyester film (refer to Japanese Patent Publication (KOKOKU) No. 55-8551), the film made of a polyester resin obtained by copolymerizing polyester with diethylene glycol, etc., (refer to Japanese Patent Publication (KOKOKU) No. 56-50692), and the polyester film produced from a low-molecular weight polyester resin (refer to Japanese Patent Publication (KOKOKU) No. 55-20514). However, the monoaxially oriented polyester film is readily linearly cut off in the oriented direction, but tends to be hardly cut off in the other directions. The polyester film made of a polyester resin obtained by copolymerizing polyester with diethylene glycol, etc., has such a problem that inherent properties of the polyester are lost by the copolymerization. Further, the polyester film produced from a low-molecular weight polyester resin tends to suffer from troubles in its production process such as cutting or breakage of the film upon a stretching step, and, therefore, tends to be unpractical.

In addition, there has been proposed the method of allowing an orientation breaking layer to intervene in a polyester film (refer to Japanese Patent Application Laid-open (KOKAI) No. 5-104618 and Japanese Patent Application No. 2002-371183). However, in this method, since it is difficult to uniformly control the orientation breaking rate, there tends to arise such a problem that the thickness of the film is largely deflected as compared to a biaxially stretched polyester film (PET film) made of polyethylene terephthalate solely.

Further, there have been proposed the method of mixing an amorphous polyester in a polyester film (Japanese Patent Application Laid-open (KOKAI) No. 2003-155403), and the method of allowing an amorphous polyester layer to intervene in a polyester film (refer to Japanese Patent Application Laid-open (KOKAI) No. 2003-220678). However, when formed into a film, the amorphous polyester tends to suffer from larger deflection in thickness as compared to a crystalline polyester. Therefore, in these methods, it may also be difficult to obtain films exhibiting a less deflection in thickness similar to PET films.

In addition, there has been proposed the method of mixing polybutylene terephthalate (PBT) having a high crystallinity in a polyester film (refer to Japanese Patent Application No. 2002-300428). However, even though polybutylene terephthalate is simply mixed with other polyesters as proposed by this method, it may be difficult to improve the deflection in thickness of the film to an extent similar to that of PET films.

SUMMARY OF THE INVENTION

The present invention has been made to solve the above problems. An object of the present invention is to provide a biaxially stretched polyester film which exhibits a less deflection in thickness and a good hand cut-off property, and can be suitably used, for example, as a packaging material.

As a result of the present inventors' earnest study for solving the above problems, it has been found that a biaxially stretched polyester film having a specific construction can exhibit a less deflection in thickness and a good hand cut-off property. The present invention has been attained on the basis of this finding.

According to the above finding, the object of the present invention can be accomplished by the following first and second aspects of the present invention.

In the first aspect of the present invention, there is provided a biaxially stretched polyester film comprising a polyester layer (layer A) which comprises polybutylene terephthalate and at least one of a copolyester and an amorphous polyester, said biaxially stretched polyester film satisfying the following requirement:

the polyester layer (layer A) exhibiting one melting point as measured by temperature-rise DSC method, and the polyester film having an edge tear resistance of not more than 100 N in each of longitudinal and width directions thereof.

In the second aspect of the present invention, there is provided a biaxially stretched polyester film comprising a polyester layer (layer A) which comprises polybutylene terephthalate and at least one of a copolyester and an amorphous polyester, said biaxially stretched polyester film satisfying the following requirement:

an average number of uncompatilized polybutylene terephthalate masses having a maximum length of not less than 1 μm which are present in a section of the layer A, being not more than 1.0 per 100 μm² of the section of the layer A, and the polyester film having an edge tear resistance of not more than 100 N in each of longitudinal and width directions thereof.

In the third aspect of the present invention, there is provided a biaxially stretched polyester film comprising a polyester layer (layer A) which comprises polybutylene terephthalate and a copolyester and has a melting point of not higher than 245° C., the polyester film having an edge tear resistance of 30 to 100 N in the longitudinal direction of the film.

DETAILED DESCRIPTION OF THE INVENTION

The present invention is described in detail below.

First, the respective components contained in the layer A of the polyester film according to each aspect of the present invention are described.

The polybutylene terephthalate contained in the layer A is typically a polyester constituted from terephthalic acid as an acid component and 1,4-butanediol as a glycol component, and may be produced by conventionally known methods. The polybutylene terephthalate may be in the form of either a homopolymer or a copolymer containing a third comonomer component.

The copolyester is typically a polyester constituted from terephthalic acid or isophthalic acid as an acid component and ethyleneglycol as a glycol component, and may be produced by conventionally known methods. The copolyester may also contain the other comonomer component.

Examples of an acid component as the other comonomer component may include aliphatic dicarboxylic acids such as adipic acid, azelaic acid, sebacic acid and decanedicarboxylic acid; and aromatic carboxylic acids such as phthalic acid, 2,6-naphthalenedicarboxylic acid, 2,7-naphthalenedicarboxylic acid, 1,5-naphthalenedicarboxylic acid, diphenoxyethanedicarboxylic acid, diphenyldicarboxylic acid, diphenyletherdicarboxylic acid and anthracenedicarboxylic acid. Examples of an alcohol component as the other comonomer component may include aliphatic diols such as diethyleneglycol, propyleneglycol, neopentylglycol, butanediol, pentanediol and hexanediol; and polyalkyleneglycols such as polyethyleneglycol, polypropyleneglycol and polytetramethyleneglycol. These acid and alcohol components may be respectively used alone or in the form of a mixture of any two or more thereof.

The amorphous polyester used herein means a polyester resin exhibiting substantially no crystallinity. More specifically, the amorphous polyester has a crystallinity of not more than 5% when the polyester is allowed to stand in a temperature range of from a glass transition temperature to a melting point thereof. Examples of the amorphous polyester may include amorphous copolyesters obtained by modifying polyethylene terephthalate with an acid and/or a diol. Examples of the modifying acid component may include terephthalic acid, isophthalic acid, adipic acid, azelaic acid, sebacic acid, 2,6-naphthalenedicarboxylic acid and 1,4-cyclohexanedicarboxylic acid. Examples of the modifying diol component may include ethyleneglycol, 1,4-butanediol, diethyleneglycol, triethyleneglycol, neopentylglycol, 1,4-cyclohexanedimethanol and polyethyleneglycol. Among the above amorphous polyester resins, in the consideration of heat resistance, mechanical properties, transparency, etc., preferred are polyester resins constituted from a dibasic acid component mainly composed of terephthalic acid, and a diol component containing 1,4-cyclohexanedimethanol in an amount of 10 to 70 mol %.

The biaxially stretched polyester film of the present invention may have either a single layer structure comprising the layer A solely, or a multi-layer structure having a polyester layer (layer B) which is laminated on at least one surface of the layer A and has a melting point higher than the melting point of the layer A. The biaxially stretched polyester film laminated with the layer B can be enhanced in mechanical properties.

The polyester constituting the layer B is such a polyester comprising an ester group obtained by polycondensation between a dicarboxylic acid and a diol or a hydroxycarboxylic acid. Examples of the dicarboxylic acid may include terephthalic acid, isophthalic acid, adipic acid, azelaic acid, sebacic acid, 2,6-naphthalenedicarboxylic acid and 1,4-cyclohexanedicarboxylic acid. Examples of the diol may include ethyleneglycol, 1,4-butanediol, diethyleneglycol, triethyleneglycol, neopentylglycol, 1,4-cyclohexanedimethanol and polyethyleneglycol. Examples of the hydroxycarboxylic acid may include p-hydroxybenzoic acid and 6-hydroxy-2-naphthoic acid. As the diol component, there may also be used glycol, ethyleneglycol, 1,4-butanediol, diethyleneglycol, triethyleneglycol, neopentylglycol, 1,4-cyclohexanedimethanol and polyethyleneglycol. The above polyester may be produced, for example, by transesterifying a lower alkyl ester of an aromatic dicarboxylic acid with a glycol, or by directly esterifying an aromatic dicarboxylic acid with a glycol to substantially form a bisglycol ester of the aromatic dicarboxylic acid or an oligomer thereof, and then heat-polycondensing the thus obtained oligomer under reduced pressure.

Typical examples of the polyester may include polyethylene terephthalate and polyethylene-2,6-naphthalate. These polymers may be in the form of either a homopolymer or a copolymer containing a third comonomer component.

The melting point of the layer B is higher than the melting point of the layer A, and preferably higher 10° C. or more, than that of the layer A. More specifically, the melting point of the layer B is usually higher than 245° C.

Also, the thickness of the layer B is usually not more than 8 μm and preferably 2 to 6 μm. In the case of the multi-layer structure in which a plurality of the layers B are laminated on the layer A, the total thickness of the layers B is usually not more than 8 μm or not more than 50% of the thickness of the layer A.

The polyester film of the present invention preferably contains fine particles to enhance a workability of the film upon a winding-up step, a coating step, a vapor deposition step, etc. Examples of the fine particles used in the present invention may include inorganic particles such as particles of calcium carbonate, magnesium carbonate, calcium sulfate, barium sulfate, lithium phosphate, magnesium phosphate, calcium phosphate, lithium fluoride, aluminum oxide, silicon oxide and kaolin; organic particles such as particles of acrylic resins and guanamine resins; and precipitated particles obtained by granulating catalyst residues, although not particularly limited thereto. The particle size and amount of the fine particles used in the present invention may be appropriately determined according to the objects and applications thereof. The fine particles contained in the polyester film may comprise a single component, or two or more components may be used as the fine particles simultaneously. The method of blending the fine particles in the raw polyester is not particularly limited, and the fine particles may be preferably blended in the raw polyester, for example, by the method of adding the fine particles thereto in the polymerization step for production of the polyester, and the method of melt-kneading the raw polyester with the fine particles. Further, the raw polyester may be appropriately blended with various additives such as stabilizers, lubricants, antistatic agents, etc.

The biaxially stretched polyester film of the present invention may be obtained by feeding the respective raw polyester materials to known melt-extruding apparatuses such as typically extruders to heat the polymer to the temperature not lower than a melting point thereof; extruding the resultant molten polymer through a slit die onto a rotary cooling drum to rapidly cool the polymer to the temperature not higher than a glass transition temperature of the polymer for solidifying the polymer, thereby forming a substantially amorphous unstretched sheet; biaxially stretching the thus obtained sheet to form a biaxially stretched film; and then thermally fixing the obtained biaxially stretched film. In this case, the stretching may be conducted by either a sequential biaxially stretching method or a simultaneous biaxially stretching method. Further, if required, the film before or after being thermally fixed may be stretched again in the longitudinal and/or transverse directions thereof. In the present invention, in order to impart a sufficient dimensional stability and a good stiffness required as a packaging material to the resultant film, the stretch ratio is usually not less than 9 times and preferably not less than 12 times calculated as an area ratio of the film between before and after the stretching. In the present invention, the heat-treating temperature used in the thermally fixing step is usually not lower than the 15° C. lower temperature of the melting initiation temperature of the layer A, and is preferably in the range of from the melting initiation temperature to the melting point of the layer A. When the heat-treating temperature is lower than the 15° C. lower temperature of the melting initiation temperature of the layer A, the resultant film may fail to exhibit a sufficient tearing property. When the heat-treating temperature is higher than the melting point of the layer A, the film tends to be readily broken in a winding-up step upon film formation, a slitting step or a processing step owing to too high tearing property thereof.

The thickness of the thus obtained biaxially stretched polyester film according to the present invention is usually 9 to 50 μm and preferably 12 to 38 μm.

Next, the first aspect of the present invention is described. The first aspect of the present invention is characterized by the biaxially stretched polyester film which comprises a polyester layer (layer A) containing polybutylene terephthalate and at least one of a copolyester and an amorphous polyester, and satisfies the requirement that the polyester layer (layer A) exhibits one melting point as measured by temperature-rise DSC method, and the polyester film has an edge tear resistance of not more than 100 N in each of a longitudinal direction (MD) and a width direction (TD) of the film.

In order to allow the layer A to exhibit one melting point as measured by temperature-rise DSC method, the ratio between polybutylene terephthalate and the copolyester and/or amorphous polyester as the raw polyester materials of the layer A may be adjusted such that the film formed from these materials have only one melting point as measured by temperature-rise DSC method.

The biaxially stretched polyester film according to the first aspect of the present invention has an edge tear resistance of not more than 100 N as measured in each of the longitudinal and width directions thereof, and the edge tear resistance in the longitudinal direction of the polyester film is preferably 30 to 100 N. When the edge tear resistance is more than 100 N, the resultant film tends to be deteriorated in tearing property. When the edge tear resistance in the longitudinal direction of the film is less than 30 N, the resultant film tends to be broken upon processing owing to too high tearing property thereof. The above tearing property, i.e., the above edge tear resistance of the polyester film, can be achieved by heat-treating the film obtained after the monoaxial stretching usually at not lower than the 15° C. lower temperature of the melting initiation temperature of the layer A and preferably in the range of from the melting initiation temperature to the melting point of the layer A. Meanwhile, the melting point of the layer A is usually not higher than 245° C.

The biaxially stretched polyester film having the above properties according to the first aspect of the present invention exhibits a less deflection in thickness and a good hand cut-off property. In particular, the deflection in thickness of the biaxially stretched polyester film according to the first aspect of the present invention is controlled such that an average value of the differences between maximum and minimum thicknesses as measured in the longitudinal direction of the film (thickness deflection Rp) is preferably not more than 5% of the thickness of the film, and an average value of the differences between maximum and minimum thicknesses as measured in the width direction of the film (thickness deflection Rv) is preferably not more than 5% of the thickness of the film.

Next, the second aspect of the present invention is explained. The second aspect of the present invention is characterized by the biaxially stretched polyester film which comprises a polyester layer (layer A) comprising polybutylene terephthalate, and at least one of a copolyester and an amorphous polyester, and which satisfies the requirement that an average number of uncompatilized polybutylene terephthalate masses having a maximum length of not less than 1 μm which are present in a section of the layer A is not more than 1.0 per 100 μm$^2$ of the section of the layer A, and the polyester film has an edge tear resistance of not more than 100 N in each of a longitudinal direction (MD) and a width direction (TD) of the film.

When observing the section of the layer A, the average number of uncompatilized PBT masses having a maximum length of not less than 1 μm is not more than 1.0 per 100 μm$^2$ of the section of the layer A. When the average number of uncompatilized PBT masses having a maximum length of not less than 1 μm is more than 1.0, the resultant film tends to exhibit a large deflection in thickness, or tends to be locally deteriorated in hand cut-off property.

The production of the polyester film in which the average number of uncompatilized PBT masses having a maximum length of not less than 1 μm is reduced to 1.0 or less per 100 μm$^2$ of the section of the layer A, may be achieved by using as the raw material, chips obtained by previously melting and mixing the raw polyester components of the layer A.

The biaxially stretched polyester film according to the second aspect of the present invention has an edge tear resistance of not more than 100 N and preferably 20 to 80 N as measured in each of the longitudinal and width directions thereof. When the edge tear resistance is more than 100 N, the resultant film tends to be deteriorated in tearing property. When the edge tear resistance is less than 20 N, the resultant film tends to be broken upon processing owing to too high tearing property thereof. The above tearing property, i.e., the above edge tear resistance of the polyester film can be achieved by heat-treating the film obtained after the monoaxial stretching usually at not lower than the 15° C. lower temperature of the melting initiation temperature of the layer A and preferably in the range of from the melting initiation temperature to the melting point of the layer A. Meanwhile, the melting point of the layer A is preferably not higher than 240° C.

The biaxially stretched polyester film having the above properties according to the second aspect of the present invention exhibits a less deflection in thickness and a good hand cut-off property. In particular, the deflection in thickness of the biaxially stretched polyester film according to the second aspect of the present invention is controlled such that an average value of the differences between maximum and minimum thicknesses as measured in the longitudinal direction of the film (thickness deflection Rp) is preferably not more than 5% of the thickness of the film, and an average value of the differences between maximum and minimum thicknesses as measured in the width direction of the film (thickness deflection Rv) is preferably not more than 5% of the thickness of the film.

Next, the third aspect of the present invention is explained. The third aspect of the present invention is characterized by the biaxially stretched polyester film comprising a polyester layer (layer A) which comprises polybutylene terephthalate and a copolyester and has a melting point of not higher than 245° C., the polyester film having an edge tear resistance of 30 to 100 N in the longitudinal direction (MD) of the film.

By adjusting the ratio between the polybutylene terephthalate and the copolyester constituting the layer A, the melting point of the layer A is controlled to usually not higher than 245° C., preferably not higher than 240° C. and more preferably 200 to 235° C.

The biaxially stretched polyester film according to the third aspect of the present invention has an edge tear resistance of usually 30 to 100 N and preferably 30 to 80 N as measured in the longitudinal directions thereof. When the edge tear resistance is more than 100 N, the resultant film tends to be deteriorated in tearing property. When the edge tear resistance is less than 30 N, the resultant film tends to be broken upon processing owing to too high tearing property thereof and, therefore, tends to be unsuitable as a packaging material. On the other hand, the edge tear resistance in the width (transverse) direction (TD) of the film is usually not more than 100 N. The above tear property, i.e., the above edge tear resistance of the polyester film can be achieved by heat-treating the film obtained after the monoaxial stretching usually at not lower than the 15° C. lower temperature of the melting initiation temperature of the layer A and preferably in the range of from the melting initiation temperature to the melting point of the layer A.

The biaxially stretched polyester film of the present invention may be printed to impart a good design property thereto, and then a sealant layer may be laminated thereon to obtain a packaging material having a good hand cut-off property. Typical examples of the packaging material include small packaging bags for drugs. Further, a gas-barrier film obtained by forming a barrier layer made of metal or metal oxide on the polyester film of the present invention by vapor deposition method or by coating the polyester film with an existing barrier layer may be used as a gas-barrier packaging material having a good hand cut-off property. In addition, a film obtained by laminating an aluminum foil on the polyester film may also be used as a gas-barrier packaging material having a good hand cut-off property.

According to the present invention, there can be obtained a biaxially stretched polyester film which exhibits not only a less deflection in thickness and a good hand cut-off property, but also is excellent in film-forming stability, processability and mechanical properties.

EXAMPLES

The present invention is described in more detail by Examples. However, these Examples are only illustrative and not intended to limit the scope of the present invention. Meanwhile, the terms "part(s)" and "%" used in Examples and Comparative Examples represent "part(s) by weight" and "% by weight", respectively. Further, various properties described in Examples and Comparative Examples were measured by the following methods.

(1) Method of Measuring an Intrinsic Viscosity [η] (dL/g) of Polymer:

One gram of the polymer was dissolved in 100 mL of a mixed solvent containing phenol and tetrachloroethane at a weight ratio of 50:50, and a viscosity of the resultant solution was measured at 30° C. using an Ubbellohde viscometer.

(2) Method of Measuring a Film Thickness:

Ten films were overlapped on each other to measure a total thickness of the thus overlapped films using a micrometer. The thickness of the film was expressed by an average value obtained by dividing the total thickness of the ten films by 10.

(3) Method of Measuring a Thickness of a Laminated Polyester Layer:

A film piece was fixedly molded in an epoxy resin, and then the resultant molded product was cut by a microtome to observe a section of the film using a transmission electron micrograph. In the section of the film, two boundary surfaces extending in substantially parallel with the surface of the film were observed by contrast thereon. Then, the distance between each of the two boundary surfaces and the surface of the film was measured with respect to 10 micrographs to calculate an average value of the measured distances as a thickness of the laminated layer.

(4) Method of Measuring a Melting Initiation Temperature and a Melting Point:

The melting initiation temperature (Tim) and the melting point were measured using a differential scanning calorimeter "DSC-7 Model" manufactured by Perkin Elmer Inc. The DSC measuring conditions were as follows. That is, 6 mg of a film specimen was set onto the DSC apparatus. The specimen was heated at a temperature rise rate of 10° C./min to detect a melting point thereof according to "how to read a DSC curve" as prescribed in JIS K7121.

(5) Method of Measuring a Tensile Break Strength:

Using a tensile tester "Model 2001 Type" manufactured by Intesco Co., Ltd., a film specimen having a length (distance between chucks) of 50 mm and a width of 15 mm was pulled at a straining rate of 200 mm/min within a room conditioned at a temperature of 23° C. and a humidity of 50% RH to measure a load applied to the specimen at breaking and calculate a tensile break strength of the specimen according to the following formula:

Tensile break strength (MPa)={Load at breaking (N)/Sectional area of the film specimen (mm$^2$)}

(6) Method of Measuring a Thickness Deflection:

Using a continuous thickness measuring apparatus manufactured by Anritsu Denki Co., Ltd., the thickness of the film was measured over its length of 9 m in the longitudinal direction thereof. An average value of the differences between maximum and minimum thicknesses as measured every 3 m in length was expressed by Rp3, and an average value of the differences between maximum and minimum thicknesses as measured at 10 positions in the width direction of the film over a width range of 1 m was expressed by Rv.

(7) Method of Measuring an Edge Tear Resistance:

An average value of tear resistance values of a film as measured according to JIS C2318-1975 was determined as an edge tear resistance of the film.

(8) Method of Measuring a Tearing Property:

A non-slit film was torn to evaluate whether or not tearing of the film was smoothly conducted, according to the following ratings. The evaluation of a tearing property of the film was performed in each of the longitudinal direction (MD) and the width direction (TD) of the film.

Rank A: Readily torn by hand;
Rank B: Relatively readily torn by hand; and
Rank C: Hardly torn by hand.

(9) Method of Measuring the Number of PBT Masses:

A film piece was fixedly molded in an epoxy resin, cut by a microtome, and burned into ashes by a low-temperature plasma ashing apparatus, and then a section of the thus obtained film was observed by a transmission electron micrograph. In the section of the film, uncompatilized PBT masses were observed by contrast thereon, and the number of the PBT masses having a length of not less than 1 μm when observing a sectional area of the film of 100 μm$^2$ was counted. An average value of the numbers of the PBT masses as counted at 10 positions of the section of the film was determined as the number of the PBT masses.

The raw polyesters used in the below-mentioned Examples and Comparative Examples were produced by the following processes.

<Process for Producing Polyester 1>

Terephthalic acid as a dicarboxylic acid component and 1,4-butanediol as a polyhydric alcohol component were subjected to melt-polycondensation reaction by an ordinary method to produce a polyester 1. The thus obtained raw polyester had an intrinsic viscosity ([η]) of 0.80 dL/g, and the polyester film produced from the raw material had a melting initiation temperature (Tim) of 213° C. and a melting point (Tpm) of 222° C.

<Process for Producing Polyester 2>

Isophthalic acid and terephthalic acid as a dicarboxylic acid component and ethyleneglycol as a polyhydric alcohol component were subjected to melt-polycondensation reaction by an ordinary method to produce a polyester 2. The content of isophthalic acid in the dicarboxylic acid component was 22 mol %. The thus obtained raw polyester had an intrinsic viscosity ([η]) of 0.69 dL/g, and the polyester film produced from the raw material had a melting initiation temperature (Tim) of 175° C. and a melting point (Tpm) of 196° C.

<Process for Producing Polyester 3>

Isophthalic acid and terephthalic acid as a dicarboxylic acid component and ethyleneglycol as a polyhydric alcohol component were subjected to melt-polycondensation reaction by an ordinary method to produce a polyester 3. The content of isophthalic acid in the dicarboxylic acid component was 15 mol %. The thus obtained raw polyester had an intrinsic viscosity ([η]) of 0.69 dL/g, and the polyester film produced from the raw material had a melting initiation temperature (Tim) of 198° C. and a melting point (Tpm) of 220° C.

<Process for Producing Polyester 4>

PETG "EASTAR 6763" (tradename) produced by Eastman Chemical Inc., was used as a polyester 4. The raw polyester had an intrinsic viscosity ([η]) of 0.75 dL/g, and the content of 1,4-cyclohexanedimethanol (CHDM) in the polyester was 32 mol %.

<Process for Producing Polyester 5>

Terephthalic acid as a dicarboxylic acid component and ethyleneglycol as a polyhydric alcohol component were subjected to melt-polycondensation reaction by an ordinary method to produce polyester chips having an average particle size of 2.5 μm and an intrinsic viscosity ([η]) of 0.70 dL/g and containing amorphous silica in an amount of 0.18 parts. The polyester film produced from the raw material had a melting initiation temperature (Tim) of 242° C. and a melting point (Tpm) of 254° C.

<Process for Poducing Polyester 6>

50 parts of the polyester 1 and 50 parts of the polyester 2 were blended with each other. The resultant mixture was melt-kneaded by a twin-screw extruder to produce a polyester 6 in the form of chips. The content of polybutylene terephthalate in the polyester 6 was 50%, and the content of isophthalic acid in the dicarboxylic acid component of the polyester 6 was 11 mol %. The polyester film produced from the raw material had a melting initiation temperature (Tim) of 202° C. and double-peak melting points (Tpm) of 213° C. and 222° C.

<Process for Producing Polyester 7>

50 parts of the polyester 3 and 50 parts of the polyester 6 were blended with each other to produce a polyester 7. The content of polybutylene terephthalate in the polyester 7 was 25%, and the content of isophthalic acid in the dicarboxylic acid component of the polyester 7 was 13 mol %. The polyester film produced from the raw material had a melting initiation temperature (Tim) of 195° C. and a melting point (Tpm) of 215° C.

<Process for Producing Polyester 8>

25 parts of the polyester 1, 50 parts of the polyester 2 and 25 parts of the polyester 5 were blended with each other. The resultant mixture was melt-kneaded by a twin-screw extruder to produce a polyester 8 in the form of chips. The content of polybutylene terephthalate in the polyester 8 was 25%, and the content of isophthalic acid in the dicarboxylic acid component of the polyester 8 was 11 mol %. The polyester film produced from the raw material had a melting initiation temperature (Tim) of 195° C. and a melting point (Tpm) of 217° C.

<Process for Producing Polyester 9>

50 parts of the polyester 1 and 50 parts of the polyester 4 were blended with each other. The resultant mixture was melt-kneaded by a twin-screw extruder to produce a polyester 9 in the form of chips. The content of polybutylene terephthalate in the polyester 9 was 50%, and the content of 1,4-cyclohexanedimethanol in the diol component of the polyester 9 was 16 mol %. The polyester film produced from the raw material had a melting initiation temperature (Tim) of 150° C. and a melting point (Tpm) of 200° C.

<Process for Producing Polyester 10>

25 parts of the polyester 1, 50 parts of the polyester 3 and 25 parts of the polyester 4 were blended with each other. The resultant mixture was melt-kneaded by a twin-screw extruder to produce a polyester 10 in the form of chips. The content of polybutylene terephthalate in the polyester 10 was 25%, the content of isophthalic acid in the dicarboxylic acid component of the polyester 10 was 7.5 mol %, and the content of 1,4-cyclohexanedimethanol in the diol component of the polyester 10 was 8 mol %. The polyester film produced from the raw material had a melting initiation temperature (Tim) of 170° C. and a melting point (Tpm) of 200° C.

<Process for Producing Polyester 11>

25 parts of the polyester 2, 25 parts of the polyester 5 and 50 parts of the polyester 6 were blended with each other to produce a polyester 11. The content of polybutylene terephthalate in the polyester 11 was 25%, and the content of isophthalic acid in the dicarboxylic acid component of the polyester 11 was 11 mol %. The polyester film produced from the raw material had a melting initiation temperature (Tim) of 195° C. and double-peak melting points (Tpm) of 212° C. and 233° C.

<Process for Producing Polyester 12>

25 parts of the polyester 1 and 75 parts of the polyester 3 were blended with each other to produce a polyester 12. The content of polybutylene terephthalate in the polyester 12 was 25%, and the content of isophthalic acid in the dicarboxylic acid component of the polyester 12 was 11 mol %. The polyester film produced from the raw material had a melting initiation temperature (Tim) of 195° C. and a melting point (Tpm) of 219° C.

<Process for Producing Polyester 13>

25 parts of the polyester 1, 50 parts of the polyester 2 and 25 parts of the polyester 5 were blended with each other to produce a polyester 13. The content of polybutylene terephthalate in the polyester 13 was 25%, and the content of isophthalic acid in the dicarboxylic acid component of the polyester 11 was 11 mol %. The polyester film produced from the raw material had a melting initiation temperature (Tim) of 195° C. and double-peak melting points (Tpm) of 212° C. and 233° C.

<Process for Producing Polyester 14>

Isophthalic acid and terephthalic acid as a dicarboxylic acid component and ethyleneglycol as a polyhydric alcohol component were subjected to melt-polycondensation reaction by an ordinary method to produce a polyester 14. The content of isophthalic acid in the dicarboxylic acid component of the polyester 14 was 8 mol %. The thus obtained raw polyester 14 had an intrinsic viscosity ([i]) of 0.69 dL/g. The polyester film produced from the raw material had a melting initiation temperature (Tim) of 213° C. and a melting point (Tpm) of 222° C.

<Process for Producing Polyester 15>

50 parts of the polyester 1 and 50 parts of the polyester 2 were blended with each other to produce a polyester 15. The content of polybutylene terephthalate in the polyester 15 was 50%, and the content of isophthalic acid in the dicarboxylic acid component of the polyester 15 was 11 mol %. The polyester film produced from the raw material had a melting initiation temperature (Tim) of 195° C. and a melting point (Tpm) of 218° C.

<Process for Producing Polyester 16>

25 parts of the polyester 1 and 75 parts of the polyester 14 were blended with each other to produce a polyester 16. The content of polybutylene terephthalate in the polyester 16 was 25%, and the content of isophthalic acid in the dicarboxylic acid component of the polyester 16 was 6 mol %. The polyester film produced from the raw material had a melting initiation temperature (Tim) of 210° C. and a melting point (Tpm) of 232° C.

<Process for Producing Polyester 17>

50 parts of the polyester 1 and 50 parts of the polyester 5 were blended with each other to produce a polyester 17. The content of polybutylene terephthalate in the polyester 17 was 50%, and the content of isophthalic acid in the dicarboxylic acid component of the polyester 17 was 0mol %. The polyester film produced from the raw material had a melting initiation temperature (Tim) of 224° C. and a melting point (Tpm) of 238° C.

<Process for Producing Polyester 18>

10 parts of the polyester 1, 10 parts of the polyester 3 and 80 parts of the polyester 5 were blended with each other to produce a polyester 18. The content of polybutylene terephthalate in the polyester 18 was 10%, and the content of isophthalic acid in the dicarboxylic acid component of the polyester 18 was 1.5 mol %. The polyester film produced from the raw material had a melting initiation temperature (Tim) of 234° C. and a melting point (Tpm) of 248° C.

Examples 1-1 to 1-6 and Comparative Examples 1 to 4

The following Examples and Comparative Examples were conducted for explaining the embodiments according to the first aspect of the present invention.

Example 1-1

Pellets of the polyester 5 and pellets of the polyester 7 were respectively melted in two separate extruders, and extruded through a laminating die to form a two-kind/three-layer polyester resin laminate having a layer structure composed of polyester 5 (layer B)/polyester 7 (layer A)/polyester 5 (layer B). The thus extruded laminate was fed onto a cooling drum maintained at a surface temperature of 30° C. and rapidly cooled thereon, thereby obtaining an unstretched film having a thickness of about 250 μm. Next, the unstretched film was stretched at 70° C. 3.6 times in the longitudinal direction thereof, preheated (heat-treated) in a tenter, stretched again at 80° C. 4.3 times in the lateral direction thereof, and then heat-treated at 200° C. for 5 sec, thereby a laminated polyester film having a thickness of 16 μm. The thicknesses of the layer B, layer A and layer B of the obtained laminated polyester film were 2 μm, 12 μm and 2 μm, respectively. Various properties of the thus obtained film are shown in Table 1 below. As a result, it was confirmed that the resultant film exhibited a less deflection in thickness, a good hand cut-off property and an excellent film-forming stability.

Example 1-2

The same procedure as defined in Example 1-1 was conducted except that the thicknesses of the layer B, layer A and layer B of the polyester film were changed to 4 μm, 8 μm and 4 μm, respectively, thereby obtaining a laminated polyester film. Various properties of the thus obtained film are shown in Table 1 below. As a result, it was confirmed that the resultant film exhibited a less deflection in thickness, a good hand cut-off property and an excellent film-forming stability.

Example 1-3

Pellets of the polyester 7 were melted in an extruder, and extruded through a single layer die onto a cooling drum maintained at a surface temperature of 25° C. and rapidly cooled thereon, thereby obtaining an unstretched film having a thickness of about 250 μm. Next, the unstretched film was stretched at 65° C. 3.6 times in the longitudinal direction thereof, preheated (heat-treated) in a tenter, stretched again at 80° C. 4.3 times in the lateral direction thereof, and then heat-treated at 200° C. for 5 sec, thereby a polyester film having a thickness of 16 μm. Various properties of the thus obtained film are shown in Table 2 below. As a result, it was confirmed that the resultant film exhibited a less deflection in thickness, a good hand cut-off property and an excellent film-forming stability.

Example 1-4

The same procedure as defined in Example 1-1 was conducted except that the polyester 8 was used as a raw material of the layer A, thereby obtaining a laminated polyester film. Various properties of the thus obtained film are shown in Table 2 below. As a result, it was confirmed that the resultant film exhibited a less deflection in thickness, a good hand cut-off property and an excellent film-forming stability.

Example 1-5

The same procedure as defined in Example 1-1 was conducted except that the polyester 9 was used as a raw material of the layer A, and the temperature of the heat treatment after the lateral stretching was changed to 190° C., thereby obtaining a laminated polyester film. Various properties of the thus obtained film are shown in Table 3 below. As a result, it was confirmed that the resultant film exhibited a less deflection in thickness, a good hand cut-off property and an excellent film-forming stability.

Example 1-6

The same procedure as defined in Example 1-1 was conducted except that the polyester 10 was used as a raw material of the layer A, and the temperature of the heat treatment after the lateral stretching was changed to 190° C., thereby obtaining a laminated polyester film. Various properties of the thus obtained film are shown in Table 3 below. As a result, it was confirmed that the resultant film exhibited a less deflection in thickness, a good hand cut-off property and an excellent film-forming stability.

Comparative Example 1

The same procedure as defined in Example 1-1 was conducted except that the polyester 6 was used as a raw material of the layer A, thereby obtaining a laminated polyester film. Various properties of the thus obtained film are shown in Table 4 below. As a result, it was confirmed that the resultant film exhibited a good hand cut-off property, but a large deflection in thickness.

Comparative Example 2

The same procedure as defined in Example 1-1 was conducted except that the polyester 11 was used as a raw material of the layer A, thereby obtaining a laminated polyester film. Various properties of the thus obtained film are shown in Table 4 below. As a result, it was confirmed that the resultant film exhibited a good hand cut-off property, but a large deflection in thickness.

Comparative Example 3

The same procedure as defined in Example 1-1 was conducted except that the polyester 3 was used as a raw material of the layer A, and the temperature of the heat treatment after the lateral stretching was changed to 225° C., thereby obtaining a laminated polyester film. Various properties of the thus obtained film are shown in Table 5 below. As a result, it was confirmed that the resultant film exhibited a good hand cut-off property, but a large deflection in thickness.

Comparative Example 4

The same procedure as defined in Example 1-3 was conducted except that the polyester 5 was used as a raw material of the layer A, and the temperature of the heat treatment after the lateral stretching was changed to 225° C., thereby obtaining a polyester film. Various properties of the thus obtained film are shown in Table 5 below. As a result, it was confirmed that the resultant film exhibited a less deflection in thickness, but a poor hand cut-off property.

TABLE 1

|  | Example 1-1 | Example 1-2 |
| --- | --- | --- |
| Layer structure | B/A/B | B/A/B |
| Thickness (layer B/layer A/layer B) (μm) | 2/12/2 | 4/8/4 |
| Resin composition of layer A | *1 | *2 |
| Resin composition of layer B | PET | PET |
| Heat-treating temperature (° C.) | 200 | 200 |
| Concentration of PBT in layer A (mol %) | 25 | 25 |
| Concentration of IPA in layer A (mol %) | 13 | 13 |
| Concentration of CHDM in layer A (mol %) | 0 | 0 |
| Melting initiation temperature of layer A (° C.) | 195 | 195 |
| Melting point of layer A (° C.) | 215 | 215 |
| Melting point of layer B (° C.) | 254 | 254 |
| Tensile break strength (MD) (MPa) | 95 | 130 |
| Tensile break strength (TD) (MPa) | 100 | 140 |
| Edge tear resistance (MD) (N) | 55 | 85 |
| Edge tear resistance (TD) (N) | 50 | 75 |
| Tearing property | A | B |
| Thickness deflection Rp3 (μm) | 0.52 | 0.60 |
| Thickness deflection Rv (μm) | 0.56 | 0.52 |

Note
*1: 50 parts of chips obtained from kneaded material containing PBT and 22 mol % IPA-copolymerized PET at ratio of 1:1; and 50 parts of 15 mol % IPA-copolymerized PET;
*2: 50 parts of chips obtained from kneaded material containing PBT and 22 mol % IPA-copolymerized PET at ratio 1:1; and 50 parts of 15 mol % IPA-copolymerized PET

TABLE 2

|  | Example 1-3 | Example 1-4 |
| --- | --- | --- |
| Layer structure | Single layer | B/A/B |
| Thickness (layer B/layer A/layer B) (μm) | 16 | 2/12/2 |
| Resin composition of layer A | *3 | *4 |
| Resin composition of layer B | — | PET |
| Heat-treating temperature (° C.) | 200 | 200 |

TABLE 2-continued

|  | Example 1-3 | Example 1-4 |
|---|---|---|
| Concentration of PBT in layer A (mol %) | 25 | 25 |
| Concentration of IPA in layer A (mol %) | 13 | 11 |
| Concentration of CHDM in layer A (mol %) | 0 | 0 |
| Melting initiation temperature of layer A (° C.) | 195 | 195 |
| Melting point of layer A (° C.) | 215 | 217 |
| Melting point of layer B (° C.) | — | 254 |
| Tensile break strength (MD) (MPa) | 75 | 100 |
| Tensile break strength (TD) (MPa) | 80 | 105 |
| Edge tear resistance (MD) (N) | 45 | 65 |
| Edge tear resistance (TD) (N) | 40 | 60 |
| Tearing property | A | A |
| Thickness deflection Rp3 (μm) | 0.65 | 0.55 |
| Thickness deflection Rv (μm) | 0.64 | 0.53 |

Note
*3: 50 parts of chips obtained from kneaded material containing PBT and 22 mol % IPA-copolymerized PET at ratio 1:1; and 50 parts of 15 mol % IPA-copolymerized PET;
*4: 100 parts of chips obtained from kneaded material containing PBT, PET and 22 mol % IPA-copolymerized PET at ratio of 1:1:2

TABLE 3

|  | Example 1-5 | Example 1-6 |
|---|---|---|
| Layer structure | B/A/B | B/A/B |
| Thickness (layer B/layer A/layer B) (μm) | 2/12/2 | 2/12/2 |
| Resin composition of layer A | *5 | *6 |
| Resin composition of layer B | PET | PET |
| Heat-treating temperature (° C.) | 190 | 190 |
| Concentration of PBT in layer A (mol %) | 50 | 25 |
| Concentration of IPA in layer A (mol %) | 0 | 7.5 |
| Concentration of CHDM in layer A (mol %) | 16 | 8 |
| Melting initiation temperature of layer A (° C.) | 150 | 170 |
| Melting point of layer A (° C.) | 200 | 200 |
| Melting point of layer B (° C.) | 254 | 254 |
| Tensile break strength (MD) (MPa) | 70 | 70 |
| Tensile break strength (TD) (MPa) | 80 | 80 |
| Edge tear resistance (MD) (N) | 50 | 50 |
| Edge tear resistance (TD) (N) | 40 | 40 |
| Tearing property | A | A |
| Thickness deflection Rp3 (μm) | 0.60 | 0.65 |
| Thickness deflection Rv (μm) | 0.66 | 0.64 |

Note
*5: 100 parts of chips obtained from kneaded material containing PBT and PETG at ratio of 1:1;
*6: 100 parts of chips obtained from kneaded material containing PBT, PETG and 15 mol % IPA-copolymerized PET at ratio of 1:1:2

TABLE 4

|  | Comparative Example 1 | Comparative Example 2 |
|---|---|---|
| Layer structure | B/A/B | B/A/B |
| Thickness (layer B/layer A/layer B) (μm) | 2/12/2 | 2/12/2 |
| Resin composition of layer A | *7 | *8 |
| Resin composition of layer B | PET | PET |
| Heat-treating temperature (° C.) | 200 | 200 |
| Concentration of PBT in layer A (mol %) | 50 | 25 |
| Concentration of IPA in layer A (mol %) | 11 | 11 |
| Concentration of CHDM in layer A (mol %) | 0 | 0 |
| Melting initiation temperature of layer A (° C.) | 202 | 195 |
| Melting point of layer A (° C.) | 213; 222 | 212; 233 |
| Melting point of layer B (° C.) | 254 | 254 |
| Tensile break strength (MD) (MPa) | 80 | 110 |
| Tensile break strength (TD) (MPa) | 85 | 115 |
| Edge tear resistance (MD) (N) | 50 | 70 |
| Edge tear resistance (TD) (N) | 40 | 65 |
| Tearing property | A | A |
| Thickness deflection Rp3 (μm) | 1.25 | 1.70 |
| Thickness deflection Rv (μm) | 1.08 | 1.56 |

Note
*7: 100 parts of chips obtained from kneaded material containing PBT and 22 mol % IPA-copolymerized PET at ratio of 1:1;
*8: 50 parts of chips obtained from kneaded material containing PBT and 22 mol % IPA-copolymerized PET at ratio of 1:1, 25 parts of 22 mol % IPA-copolymerized PET, and 25 parts of PET

TABLE 5

|  | Comparative Example 3 | Comparative Example 4 |
|---|---|---|
| Layer structure | B/A/B | Single layer |
| Thickness (layer B/layer A/layer B) (μm) | 2/12/2 | 16 |
| Resin composition of layer A | *9 | *10 |
| Resin composition of layer B | PET | — |
| Heat-treating temperature (° C.) | 225 | 225 |
| Concentration of PBT in layer A (mol %) | 0 | 0 |
| Concentration of IPA in layer A (mol %) | 15 | 0 |

TABLE 5-continued

|  | Comparative Example 3 | Comparative Example 4 |
| --- | --- | --- |
| Concentration of CHDM in layer A (mol %) | 0 | 0 |
| Melting initiation temperature of layer A (° C.) | 198 | 242 |
| Melting point of layer A (° C.) | 220 | 254 |
| Melting point of layer B (° C.) | 254 | — |
| Tensile break strength (MD) (MPa) | 70 | 220 |
| Tensile break strength (TD) (MPa) | 80 | 220 |
| Edge tear resistance (MD) (N) | 45 | 120 |
| Edge tear resistance (TD) (N) | 40 | 110 |
| Tearing property | A | C |
| Thickness deflection Rp3 (µm) | 1.09 | 0.65 |
| Thickness deflection Rv (µm) | 0.95 | 0.60 |

Note
*9: 100 parts of 15 mol % IPA-copolymerized PET;
*10: 100 parts of PET

Examples 2-1 to 2-7 and Comparative Examples 5 and 6

The following Examples and Comparative Examples were conducted for explaining the embodiments according to the second aspect of the present invention.

Example 2-1

Pellets of the polyester 5 and pellets of the polyester 7 were respectively melted in two separate single-screw extruders, and extruded through a laminating die to form a two-kind/three-layer polyester resin laminate having a layer structure composed of polyester 5 (layer B)/polyester 7 (layer A)/polyester 5 (layer B). The thus extruded laminate was fed onto a cooling drum maintained at a surface temperature of 30° C. and rapidly cooled thereon, thereby obtaining an unstretched film having a thickness of about 250 µm. Next, the unstretched film was stretched at 70° C. 3.6 times in the longitudinal direction thereof, preheated (heat-treated) in a tenter, stretched again at 80° C. 4.3 times in the lateral direction thereof, and then heat-treated at 200° C. for 5 sec, thereby a laminated polyester film having a thickness of 16 µm. The thicknesses of the layer B, layer A and layer B of the obtained laminated polyester film were 2 µm, 12 µm and 2 µm, respectively. Various properties of the thus obtained film are shown in Table 6 below. As a result, it was confirmed that the resultant film exhibited a less deflection in thickness, a good hand cut-off property and an excellent film-forming stability.

Example 2-2

The same procedure as defined in Example 2-1 was conducted except that the thicknesses of the layer B, layer A and layer B of the polyester film were changed to 4 µm, 8 µm and 4 µm, respectively, thereby obtaining a laminated polyester film. Various properties of the thus obtained film are shown in Table 6 below. As a result, it was confirmed that the resultant film exhibited a less deflection in thickness and a relatively good hand cut-off property.

Example 2-3

Pellets of the polyester 7 were melted in a single-screw extruder, and extruded through a single layer die onto a cooling drum maintained at a surface temperature of 25° C. and rapidly cooled thereon, thereby obtaining an unstretched film having a thickness of about 250 µm. Next, the unstretched film was stretched at 65° C. 3.6 times in the longitudinal direction thereof, preheated (heat-treated) in a tenter, stretched again at 80° C. 4.3 times in the lateral direction thereof, and then heat-treated at 200° C. for 5 sec, thereby obtaining a polyester film having a thickness of 16 µm. Various properties of the thus obtained film are shown in Table 7 below. As a result, it was confirmed that the resultant film exhibited a less deflection in thickness, a good hand cut-off property and an excellent film-forming stability.

Example 2-4

The same procedure as defined in Example 2-1 was conducted except that the polyester 8 was used as a raw material of the layer A, thereby obtaining a laminated polyester film. Various properties of the thus obtained film are shown in Table 7 below. As a result, it was confirmed that the resultant film exhibited a less deflection in thickness, a good hand cut-off property and an excellent film-forming stability.

Example 2-5

The same procedure as defined in Example 2-1 was conducted except that the polyester 9 was used as a raw material of the layer A, and the temperature of the heat treatment after the lateral stretching was changed to 190° C., thereby obtaining a laminated polyester film. Various properties of the thus obtained film are shown in Table 8 below. As a result, it was confirmed that the resultant film exhibited a less deflection in thickness, a good hand cut-off property and an excellent film-forming stability.

Example 2-6

The same procedure as defined in Example 2-1 was conducted except that the polyester 10 was used as a raw material of the layer A, and the temperature of the heat treatment after the lateral stretching was changed to 190° C., thereby obtaining a laminated polyester film. Various properties of the thus obtained film are shown in Table 8 below. As a result, it was confirmed that the resultant film exhibited a less deflection in thickness, a good hand cut-off property and an excellent film-forming stability.

Example 2-7

The same procedure as defined in Example 2-1 was conducted except that the polyester 12 was used as a raw material of the layer A, and pellet of the polyester 12 were melted in a twin-screw extruder, thereby obtaining a laminated polyester film. Various properties of the thus obtained film are shown in Table 9 below. As a result, it was confirmed that the resultant film exhibited a less deflection in thickness, a good hand cut-off property and an excellent film-forming stability.

Comparative Example 5

The same procedure as defined in Example 2-7 was conducted except that the polyester 12 was used as a raw material of the layer A, and pellet of the polyester 12 were melted in a single-screw extruder, thereby obtaining a laminated polyester film. Various properties of the thus obtained film are shown in Table 10 below. As a result, it was confirmed that the resultant film exhibited a good hand cut-off property, but a large deflection in thickness.

Comparative Example 6

The same procedure as defined in Example 2-1 was conducted except that the polyester 13 was used as a raw material of the layer A, thereby obtaining a laminated polyester film. Various properties of the thus obtained film are shown in Table 10 below. As a result, it was confirmed that the resultant film exhibited a good hand cut-off property, but a large deflection in thickness.

TABLE 6

|  | Example 2-1 | Example 2-2 |
|---|---|---|
| Layer structure | B/A/B | B/A/B |
| Thickness (layer B/layer A/layer B) (μm) | 2/12/2 | 4/8/4 |
| Resin composition of layer A | *11 | *12 |
| Resin composition of layer B | PET | PET |
| Extruder | Single-screw | Single-screw |
| Heat-treating temperature (° C.) | 200 | 200 |
| Concentration of PBT in layer A (mol %) | 25 | 25 |
| Concentration of IPA in layer A (mol %) | 13 | 13 |
| Concentration of CHDM in layer A (mol %) | 0 | 0 |
| Melting initiation temperature of layer A (° C.) | 195 | 195 |
| Melting point of layer A (° C.) | 215 | 215 |
| Melting point of layer B (° C.) | 254 | 254 |
| Tensile break strength (MD) (MPa) | 95 | 130 |
| Tensile break strength (TD) (MPa) | 100 | 140 |
| Edge tear resistance (MD) (N) | 55 | 85 |
| Edge tear resistance (TD) (N) | 50 | 75 |
| Tearing property | A | B |
| Number of PBT masses (per 100 μm$^2$) | 0.0 | 0.0 |
| Thickness deflection Rp3 (μm) | 0.52 | 0.60 |
| Thickness deflection Rv (μm) | 0.56 | 0.52 |

Note
*11: 50 parts of chips obtained from kneaded material containing PBT and 22 mol % IPA-copolymerized PET at ratio of 1:1, and 50 parts of 15 mol % IPA-copolymerized PET;
*12: 50 parts of chips obtained from kneaded material containing PBT and 22 mol % IPA-copolymerized PET at ratio 1:1, and 50 parts of 15 mol % IPA-copolymerized PET

TABLE 7

|  | Example 2-3 | Example 2-4 |
|---|---|---|
| Layer structure | Single layer | B/A/B |
| Thickness (layer B/layer A/layer B) (μm) | 16 | 2/12/2 |
| Resin composition of layer A | *13 | *14 |
| Resin composition of layer B | — | PET |
| Extruder | Single-screw | Single-screw |
| Heat-treating temperature (° C.) | 200 | 200 |
| Concentration of PBT in layer A (mol %) | 25 | 25 |
| Concentration of IPA in layer A (mol %) | 13 | 11 |
| Concentration of CHDM in layer A (mol %) | 0 | 0 |
| Melting initiation temperature of layer A (° C.) | 195 | 195 |
| Melting point of layer A (° C.) | 215 | 217 |
| Melting point of layer B (° C.) | — | 254 |
| Tensile break strength (MD) (MPa) | 75 | 100 |
| Tensile break strength (TD) (MPa) | 80 | 105 |
| Edge tear resistance (MD) (N) | 45 | 65 |
| Edge tear resistance (TD) (N) | 40 | 60 |
| Tearing property | A | A |
| Number of PBT masses (per 100 μm$^2$) | 0.0 | 0.0 |
| Thickness deflection Rp3 (μm) | 0.65 | 0.55 |
| Thickness deflection Rv (μm) | 0.64 | 0.53 |

Note
*13: 50 parts of chips obtained from kneaded material containing PBT and 22 mol % IPA-copolymerized PET at ratio 1:1, and 50 parts of 15 mol % IPA-copolymerized PET;
*14: 100 parts of chips obtained from kneaded material containing PBT, PET and 22 mol % IPA-copolymerized PET at ratio of 1:1:2

TABLE 8

|  | Example 2-5 | Example 2-6 |
|---|---|---|
| Layer structure | B/A/B | B/A/B |
| Thickness (layer B/layer A/layer B) (μm) | 2/12/2 | 2/12/2 |
| Resin composition of layer A | *15 | *16 |
| Resin composition of layer B | PET | PET |
| Extruder | Single-screw | Single-screw |
| Heat-treating temperature (° C.) | 190 | 190 |
| Concentration of PBT in layer A (mol %) | 50 | 25 |
| Concentration of IPA in layer A (mol %) | 0 | 7.5 |
| Concentration of CHDM in layer A (mol %) | 16 | 8 |
| Melting initiation temperature of layer A (° C.) | 150 | 170 |
| Melting point of layer A (° C.) | 200 | 200 |
| Melting point of layer B (° C.) | 254 | 254 |
| Tensile break strength (MD) (MPa) | 70 | 70 |
| Tensile break strength (TD) (MPa) | 80 | 80 |
| Edge tear resistance (MD) (N) | 50 | 50 |
| Edge tear resistance (TD) (N) | 40 | 40 |
| Tearing property | A | A |
| Number of PBT masses (per 100 μm$^2$) | 0.0 | 0.0 |

TABLE 8-continued

|  | Example 2-5 | Example 2-6 |
|---|---|---|
| Thickness deflection Rp3 (μm) | 0.60 | 0.65 |
| Thickness deflection Rv (μm) | 0.66 | 0.64 |

Note
*15: 100 parts of chips obtained from kneaded material containing PBT and PETG at ratio of 1:1;
*16: 100 parts of chips obtained from kneaded material containing 25 parts of PBT, 25 parts of PETG and 50 parts of 15 mol % IPA-copolymerized PET at ratio of 1:1:2

TABLE 9

|  | Example 2-7 |
|---|---|
| Layer structure | B/A/B |
| Thickness (layer B/layer A/layer B) (μm) | 2/12/2 |
| Resin composition of layer A | *17 |
| Resin composition of layer B | PET |
| Extruder | Twin-screw |
| Heat-treating temperature (° C.) | 200 |
| Concentration of PBT in layer A (mol %) | 25 |
| Concentration of IPA in layer A (mol %) | 11 |
| Concentration of CHDM in layer A (mol %) | 0 |
| Melting initiation temperature of layer A (° C.) | 195 |
| Melting point of layer A (° C.) | 217 |
| Melting point of layer B (° C.) | 254 |
| Tensile break strength (MD) (MPa) | 80 |
| Tensile break strength (TD) (MPa) | 85 |
| Edge tear resistance (MD) (N) | 50 |
| Edge tear resistance (TD) (N) | 40 |
| Tearing property | A |
| Number of PBT masses (per 100 μm²) | 0.2 |
| Thickness deflection Rp3 (μm) | 0.80 |
| Thickness deflection Rv (μm) | 0.85 |

Note
*17: 25 parts of PBT and 75 parts of 15 mol % IPA-copolymerized PET

TABLE 10

|  | Comparative Example 5 | Comparative Example 6 |
|---|---|---|
| Layer structure | B/A/B | B/A/B |
| Thickness (layer B/layer A/layer B) (μm) | 2/12/2 | 2/12/2 |
| Resin composition of layer A | *18 | *19 |
| Resin composition of layer B | PET | PET |
| Extruder | Single-screw | Single-screw |
| Heat-treating temperature (° C.) | 200 | 200 |
| Concentration of PBT in layer A (mol %) | 25 | 25 |
| Concentration of IPA in layer A (mol %) | 11 | 11 |
| Concentration of CHDM in layer A (mol %) | 0 | 0 |

TABLE 10-continued

|  | Comparative Example 5 | Comparative Example 6 |
|---|---|---|
| Melting initiation temperature of layer A (° C.) | 195 | 195 |
| Melting point of layer A (° C.) | 219 | 212; 233 |
| Melting point of layer B (° C.) | 254 | 254 |
| Tensile break strength (MD) (MPa) | 80 | 110 |
| Tensile break strength (TD) (MPa) | 85 | 115 |
| Edge tear resistance (MD) (N) | 50 | 70 |
| Edge tear resistance (TD) (N) | 40 | 65 |
| Tearing property | A | A |
| Number of PBT masses (per 100 μm²) | 2.5 | 10.0 |
| Thickness deflection Rp3 (μm) | 1.35 | 1.70 |
| Thickness deflection Rv (μm) | 1.40 | 1.56 |

Note
*18: 25 parts of PBT and 75 parts of 15 mol % IPA-copolymerized PET;
*19: 25 parts of PBT, 50 parts of 22 mol % IPA-copolymerized PET and 25 parts of PET Examples 3-1 to 3-6 and Comparative Examples 7 to 11

The following Examples and Comparative Examples were conducted for explaining the embodiments according to the third aspect of the present invention.

Example 3-1

Pellets of the polyester 5 and pellets of the polyester 12 were respectively melted in two separate extruders, and extruded through a laminating die to form a two-kind/three-layer polyester resin laminate having a layer structure composed of polyester 5 (layer B)/polyester 12 (layer A)/polyester 5 (layer B). The thus extruded laminate was fed onto a cooling drum maintained at a surface temperature of 30° C. and rapidly cooled thereon, thereby obtaining an unstretched film having a thickness of about 250 μm. Next, the unstretched film was stretched at 75° C. 3.6 times in the longitudinal direction thereof, preheated (heat-treated) in a tenter, stretched again at 80° C. 4.1 times in the lateral direction thereof, and then heat-treated at 205° C. for 5 sec, thereby a laminated polyester film having a thickness of 16 μm. The thicknesses of the layer B, layer A and layer B of the obtained laminated polyester film were 2 μm, 12 μm and 2 μm, respectively. Various properties of the thus obtained film are shown in Table 11 below. As a result, it was confirmed that the resultant film exhibited a less deflection in thickness, a good hand cut-off property and an excellent film-forming stability.

Example 3-2

The same procedure as defined in Example 3-1 was conducted except that the thicknesses of the layer B, layer A and layer B of the polyester film were changed to 4 μm, 8 μm and 4 μm, respectively, thereby obtaining a laminated polyester film. Various properties of the thus obtained film are shown in Table 11 below. As a result, it was confirmed that the resultant film exhibited a less deflection in thickness, a good hand cut-off property and an excellent film-forming stability.

Example 3-3

The same procedure as defined in Example 3-1 was conducted except that the polyester 15 was used as a raw material of the layer A, thereby obtaining a laminated polyester film. Various properties of the thus obtained film are shown in Table 12 below. As a result, it was confirmed that the resultant film exhibited a less deflection in thickness, a good hand cut-off property and an excellent film-forming stability.

Example 3-4

Pellets of the polyester 15 were melted in an extruder, and extruded through a single layer die onto a cooling drum maintained at a surface temperature of 25° C. and rapidly cooled thereon, thereby obtaining an unstretched film having a thickness of about 250 μm. Next, the unstretched film was stretched at 65° C. 3.8 times in the longitudinal direction thereof, preheated (heat-treated) in a tenter, stretched again at 80° C. 4.1 times in the lateral direction thereof, and then heat-treated at 190° C. for 5 sec, thereby obtaining a polyester film having a thickness of 16 μm. Various properties of the thus obtained film are shown in Table 12 below. As a result, it was confirmed that the resultant film exhibited a less deflection in thickness, a good hand cut-off property and an excellent film-forming stability.

Example 3-5

The same procedure as defined in Example 3-1 was conducted except that the polyester 16 was used as a raw material of the layer A, and the temperature of the heat treatment after the lateral stretching was changed to 225° C., thereby obtaining a laminated polyester film. Various properties of the thus obtained film are shown in Table 13 below. As a result, it was confirmed that the resultant film exhibited a less deflection in thickness, a good hand cut-off property and an excellent film-forming stability.

Example 3-6

The same procedure as defined in Example 3-1 was conducted except that the temperature of the heat treatment after the lateral stretching was changed to 190° C., thereby obtaining a laminated polyester film. Various properties of the thus obtained film are shown in Table 13 below. As a result, it was confirmed that the resultant film exhibited a less deflection in thickness, a good hand cut-off property and an excellent film-forming stability.

Comparative Example 7

The same procedure as defined in Example 3-6 was conducted except that the polyester 3 was used as a raw material of the layer A, thereby obtaining a polyester film. Various properties of the thus obtained film are shown in Table 14 below. As a result, it was confirmed that the resultant film exhibited a poor hand cut-off property.

Comparative Example 8

The same procedure as defined in Example 3-1 was conducted except that the polyester 17 was used as a raw material of the layer A, and the temperature of the heat treatment after the lateral stretching was changed to 220° C., thereby obtaining a laminated polyester film. Various properties of the thus obtained film are shown in Table 14 below. As a result, it was confirmed that the resultant film exhibited a poor hand cut-off property.

Comparative Example 9

The same procedure as defined in Example 3-1 was conducted except that the polyester 18 was used as a raw material of the layer A, and the temperature of the heat treatment after the lateral stretching was changed to 230° C., thereby obtaining a laminated polyester film. Various properties of the thus obtained film are shown in Table 15 below. As a result, it was confirmed that the resultant film exhibited a poor hand cut-off property.

Comparative Example 10

The same procedure as defined in Example 3-1 was conducted except that the temperature of the heat treatment after the lateral stretching was changed to 230° C., thereby obtaining a laminated polyester film. Various properties of the thus obtained film are shown in Table 15 below. As a result, it was confirmed that the resultant film exhibited a very good hand cut-off property, but was readily broken upon a winding-up step or a slitting (SLT) step owing to too high tearing property thereof, so that it was very difficult to wind up the film into a roll.

Comparative Example 11

The same procedure as defined in Example 3-1 was conducted except that the thicknesses of the layer B, layer A and layer B of the polyester film were changed to 5 μm, 6 μm and 5 μm, respectively, thereby obtaining a laminated polyester film. Various properties of the thus obtained film are shown in Table 16 below. As a result, it was confirmed that the resultant film exhibited a poor hand cut-off property.

TABLE 11

|  | Example 3-1 | Example 3-2 |
|---|---|---|
| Layer structure | B/A/B | B/A/B |
| Thickness (layer B/layer A/layer B) (μm) | 2/12/2 | 4/8/4 |
| Resin composition of layer A | *20 | *21 |
| Resin composition of layer B | PET | PET |
| Heat-treating temperature (° C.) | 205 | 205 |
| Concentration of PBT in layer A (mol %) | 25 | 25 |
| Concentration of IPA in layer A (mol %) | 11 | 11 |
| Melting initiation temperature of layer A (° C.) | 195 | 195 |
| Melting point of layer A (° C.) | 217 | 217 |
| Melting point of layer B (° C.) | 254 | 254 |
| Tensile break strength (MD) (MPa) | 100 | 130 |
| Tensile break strength (TD) (MPa) | 100 | 140 |
| Edge tear resistance (MD) (N) | 70 | 90 |
| Edge tear resistance (TD) (N) | 70 | 80 |

TABLE 11-continued

|  | Example 3-1 | Example 3-2 |
|---|---|---|
| Tearing property | A | B |
| Film forming stability | Good | Good |

Note
*20: 25 parts of PBT and 75 parts of 15 mol % IPA-copolymerized PET;
*21: 25 parts of PBT and 75 parts of 15 mol % IPA-copolymerized PET

TABLE 12

|  | Example 3-3 | Example 3-4 |
|---|---|---|
| Layer structure | B/A/B | Single layer |
| Thickness (layer B/layer A/layer B) (μm) | 2/12/2 | 16 |
| Resin composition of layer A | *22 | *23 |
| Resin composition of layer B | PET | — |
| Heat-treating temperature (° C.) | 205 | 190 |
| Concentration of PBT in layer A (mol %) | 50 | 50 |
| Concentration of IPA in layer A (mol %) | 11 | 11 |
| Melting initiation temperature of layer A (° C.) | 195 | 195 |
| Melting point of layer A (° C.) | 218 | 218 |
| Melting point of layer B (° C.) | 254 | — |
| Tensile break strength (MD) (MPa) | 110 | 90 |
| Tensile break strength (TD) (MPa) | 110 | 90 |
| Edge tear resistance (MD) (N) | 60 | 60 |
| Edge tear resistance (TD) (N) | 60 | 60 |
| Tearing property | A | A |
| Film forming stability | Good | Good |

Note
*22: 50 parts of PBT and 50 parts of 22 mol % IPA-copolymerized PET;
*23: 50 parts of PBT and 50 parts of 22 mol % IPA-copolymerized PET

TABLE 13

|  | Example 3-5 | Example 3-6 |
|---|---|---|
| Layer structure | B/A/B | B/A/B |
| Thickness (layer B/layer A/layer B) (μm) | 2/12/2 | 2/12/2 |
| Resin composition of layer A | *24 | *25 |
| Resin composition of layer B | PET | PET |
| Heat-treating temperature (° C.) | 225 | 190 |
| Concentration of PBT in layer A (mol %) | 25 | 25 |
| Concentration of IPA in layer A (mol %) | 6 | 11 |
| Melting initiation temperature of layer A (° C.) | 210 | 195 |
| Melting point of layer A (° C.) | 232 | 217 |
| Melting point of layer B (° C.) | 254 | 254 |
| Tensile break strength (MD) (MPa) | 120 | 140 |
| Tensile break strength (TD) (MPa) | 130 | 150 |

TABLE 13-continued

|  | Example 3-5 | Example 3-6 |
|---|---|---|
| Edge tear resistance (MD) (N) | 70 | 95 |
| Edge tear resistance (TD) (N) | 65 | 90 |
| Tearing property | A | A |
| Film forming stability | Good | Good |

Note
*24: 25 parts of PBT and 75 parts of 8 mol % IPA-copolymerized PET;
*25: 25 parts of PBT and 75 parts of 15 mol % IPA-copolymerized PET

TABLE 14

|  | Comparative Example 7 | Comparative Example 8 |
|---|---|---|
| Layer structure | B/A/B | B/A/B |
| Thickness (layer B/layer A/layer B) (μm) | 2/12/2 | 2/12/2 |
| Resin composition of layer A | *26 | *27 |
| Resin composition of layer B | PET | PET |
| Heat-treating temperature (° C.) | 190 | 220 |
| Concentration of PBT in layer A (mol %) | 0 | 50 |
| Concentration of IPA in layer A (mol %) | 15 | 0 |
| Melting initiation temperature of layer A (° C.) | 198 | 224 |
| Melting point of layer A (° C.) | 220 | 238 |
| Melting point of layer B (° C.) | 254 | 254 |
| Tensile break strength (MD) (MPa) | 220 | 220 |
| Tensile break strength (TD) (MPa) | 230 | 230 |
| Edge tear resistance (MD) (N) | 150 | 140 |
| Edge tear resistance (TD) (N) | 140 | 130 |
| Tearing property | C | C |
| Film forming stability | Good | Good |

Note
*26: 15 mol % IPA-copolymerized PET;
*27: 50 parts of PBT and 50 parts of PET

TABLE 15

|  | Comparative Example 9 | Comparative Example 10 |
|---|---|---|
| Layer structure | B/A/B | B/A/B |
| Thickness (layer B/layer A/layer B) (μm) | 2/12/2 | 2/12/2 |
| Resin composition of layer A | *28 | *29 |
| Resin composition of layer B | PET | PET |
| Heat-treating temperature (° C.) | 230 | 230 |
| Concentration of PBT in layer A (mol %) | 10 | 25 |
| Concentration of IPA in layer A (mol %) | 1.5 | 11 |
| Melting initiation temperature of layer A (° C.) | 234 | 195 |
| Melting point of layer A (° C.) | 248 | 217 |

TABLE 15-continued

|  | Comparative Example 9 | Comparative Example 10 |
|---|---|---|
| Melting point of layer B (° C.) | 254 | 254 |
| Tensile break strength (MD) (MPa) | 210 | 75 |
| Tensile break strength (TD) (MPa) | 220 | 75 |
| Edge tear resistance (MD) (N) | 150 | 25 |
| Edge tear resistance (TD) (N) | 140 | 25 |
| Tearing property | C | A |
| Film forming stability | Good | Broken in winding-up and slitting steps, resulting in difficult film formation |

Note
*28: 10 parts of PBT, 10 parts of 15 mol % IPA-copolymerized PET and 80 parts of PET;
*29: 25 parts of PBT and 75 parts of 15 mol % IPA-copolymerized PET

TABLE 16

|  | Comparative Example 11 |
|---|---|
| Layer structure | B/A/B |
| Thickness (layer B/layer A/layer B) (μm) | 5/6/5 |
| Resin composition of layer A | *30 |
| Resin composition of layer B | PET |
| Heat-treating temperature (° C.) | 205 |
| Concentration of PBT in layer A (mol %) | 25 |
| Concentration of IPA in layer A (mol %) | 11 |
| Melting initiation temperature of layer A (° C.) | 195 |
| Melting point of layer A (° C.) | 217 |
| Melting point of layer B (° C.) | 254 |
| Tensile break strength (MD) (MPa) | 160 |
| Tensile break strength (TD) (MPa) | 170 |
| Edge tear resistance (MD) (N) | 130 |
| Edge tear resistance (TD) (N) | 120 |
| Tearing property | C |
| Film forming stability | Good |

Note
*30: 25 parts of PBT and 75 parts of 15 mol % IPA-copolymerized PET

In the above respective Tables, PBT represents polybutylene terephthalate; PET represents polyethylene terephthalate; IPA represents isophthalic acid; CHDM represents 1,4-cyclohexanedimethanol; PETG represents 1,4-cyclohexanedimethanol copolymerized with 32 mol % of CHDM; and PETG represents "EASTAR 6763" (tradename) produced by Eastman Chemical Inc.

What is claimed is:

1. A biaxially stretched polyester film comprising a polyester layer (layer A) which comprises polybutylene terephthalate homopolymer and at least one of a copolyester and an amorphous polyester, said biaxially stretched polyester film satisfying any one of the following requirements:
   (1) the polyester layer (layer A) exhibiting one melting point as measured by temperature-ride DSC method, and the polyester film having an edge tear resistance of not more than 100 N in each of longitudinal and width directions thereof; and
   (2) an average number of uncompatilized polybutylene terephthalate masses having a maximum length of not less than 1 μm which are present in a section of the layer A, being not more than 1.0 per 100 μm$^2$ of the section of the layer A, and the polyester film having an edge tear resistance of not more than 100 N in each of longitudinal and width directions thereof.

2. A biaxially stretched polyester film according to claim 1, further comprising a polyester layer (layer B) having a melting point higher than the melting point of the layer A, the layer B being laminated on at least one surface of the layer A.

3. A biaxially stretched polyester film according to claim 2, wherein the layer B has a thickness of not more than 8 μm.

4. A biaxially stretched polyester film according to claim 2, wherein the layer B has a melting point higher 10°C. or more, than the melting point of the layer A.

5. A biaxially stretched polyester film according to claim 1, wherein in the case of satisfying requirement (1) the polyester film has an edge tear resistance of 30 to 100 N in each of longitudinal directions thereof and in the case of satisfying requirement (2) the polyester film has an edge tear resistance of not more than 100 N and not less than 20 N in each of longitudinal and width directions thereof.

* * * * *